United States Patent [19]

Taylor et al.

[11] 4,101,835

[45] Jul. 18, 1978

[54] METHOD AND ELECTRONIC CONTROL DEVICE FOR RADIO TELEPHONE COMMUNICATION

[75] Inventors: Frank D. Taylor; Ronald J. Novotny, both of Omaha, Nebr.

[73] Assignee: General Communications Co., Inc., Omaha, Nebr.

[21] Appl. No.: 684,304

[22] Filed: May 7, 1976

[51] Int. Cl.² .......................... H04B 3/60; H04B 5/04
[52] U.S. Cl. .................................. 325/55; 179/2 EB; 325/64; 343/177
[58] Field of Search .......................... 325/55, 64, 5, 16; 179/41 A; 343/176, 177

[56] References Cited

U.S. PATENT DOCUMENTS

| 2,722,598 | 11/1955 | McDonald | 325/55 |
| 3,065,421 | 11/1962 | Hart | 343/177 |
| 3,193,623 | 7/1965 | Burns et al. | 325/64 |
| 3,586,978 | 6/1971 | Van Gorder | 179/41 A |

Primary Examiner—Robert L. Griffin
Assistant Examiner—Marc E. Bookbinder
Attorney, Agent, or Firm—Lowe, Kokjer, Kircher, et al.

[57] ABSTRACT

An electronic control device interfaces a duplexed frequency radio communications system with an ordinary telephone set to enable two-way communication between mobile two-way radios and land line telephones. In response to an enabling signal transmitted from a mobile radio unit, the electronic interface device automatically connects an associated base station radio with outgoing telephone lines thereby allowing the operator of the mobile radio to direct dial a land-line telephone using an encoder device associated with the mobile radio unit. In response to a disabling signal, initiated by either the mobile unit operator or a land-line party, the interface device functions to automatically disconnect the telephone line from the base station radio, thereby terminating the call. Alternatively, a timing circuit likewise terminates the call after a preselected time following transmission of the last communication. The ordinary ringing signal produced by an incoming telephone call to the base station may be relayed by means of the interface device to the mobile unit operator who may respond thereto by transmitting the enabling signal to the interface device which causes the call to be answered and placed through to the mobile unit. Optionally, the land-line calling party may transmit a coded enabling signal to effect the placement of the call through to the mobile unit.

30 Claims, 5 Drawing Figures

METHOD AND ELECTRONIC CONTROL DEVICE FOR RADIO TELEPHONE COMMUNICATION

BACKGROUND AND BRIEF DESCRIPTION OF THE INVENTION

The present invention relates in general to mobile radio communications, and deals more particularly with the art of interfacing a half duplex frequency two-way radio communications system with ordinary land-line telephone networks.

Dedicated mobile telephones systems and remote telephone calling and answering systems are well known. Also known is the use of ordinary two-way mobile radios and an associated base radio station to communicatively link a mobile telephone terminal with land-line telephone exchanges. A system of this type is disclosed in U.S. Pat. No. 3,586,978 to Duyck Van Gorder. However, prior art systems possess several deficiencies which preclude their use in certain applications and impede their effectiveness under some circumstances.

The present invention surmounts these shortcomings, in part through the use of several novel features including dual radio operating frequencies to allow half duplex transmission and reception, and unique circuit means which allow the licensee of the radio communications system to maintain exclusive control of the base station radio.

The subject invention provides for communicatively interfacing a base station radio having separate frequencies for transmission and reception, to ordinary telephone networks. A carrier frequency actuated relay is operated by an incoming signal transmitted from a mobile radio, thereby switching the base station audio as required. Upon decoding, an enabling signal actuates a relay combination to connect incoming telephone lines via an audio coupling transformer to the base station radio, thereby accessing the telephone network to the mobile radio operator. Similarly, the decoding means are responsive to ring signals and enabling signals produced by an incoming telephone call, likewise accessing the mobile radio units to the land-line caller. As an optional feature, circuit means are provided to detect a received ringing signal and function to cause the same to be transmitted to the mobile radio units to alert the mobile personnel of the presence of the incoming call at the base radio station. The decoding means further function to detect a disable signal received from either a mobile radio or a land-line telephone, and operate to unlatch relay combinations which disconnect the audio coupling transformer from the base station radio and telephone lines. A protective timing circuit is operative to likewise effect this disconnection after a preselected elapsed time following the last detected communication.

A primary object of the invention is to provide a unique method and electronic control device for radio telephone communication.

Another object of the invention is to provide a unique method and electronic control device for communicatively interfacing a half duplexed frequency radio communications system with ordinary land-line telephones.

Another object of the invention is to provide a method and electronic control device of the character described wherein the said electronic control device functions to automatically interface a base station radio with an ordinary telephone set.

Another object of the invention is to provide a method and electronic control device of the character described immediately above which includes circuit means that function to automatically connect the associated base station radio with an outgoing telephone line, upon receipt of a coded enabling signal, such that the mobile operator may carry on an ordinary conversation with a land-line party over said telephone line. It is a feature of the invention that the enabling coded signal may be generated either by a mobile radio unit operator or a party having access to a land-line telephone set.

A still further object of the invention is to provide a method and device of the character described allowing the lincensee of the base radio station to maintain exclusive operative control thereof, thereby permitting the legal use of same in connection with business, industrial and public security applications. Known prior art devices, such as mobile telephones do not provide this necessary exclusive control feature and therefore do not conform to the Rules and Regulations of the Federal Communications Commission so as to legalize their use in above-mentioned applications.

Another object of the invention is to provide, in a communication environment of the character described, a unique circuit means and control device to modulate a base station radio transmitter using a distant land-line telephone. Known prior art accomplishes this function through the use of more expensive leased telephone lines or, alternatively, through the use of microwave communication.

A further object of the invention is to provide, in a communication environment of the character described, a unique circuit means and control device to notify a mobile unit operator of an incoming telephone call to the associated base radio station.

Another object of the invention is to provide a method and device of the character described which enables radio communications systems of different operating frequencies to intercommunicate with each other via ordinary dial network telephone lines.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views.

Figure 3:
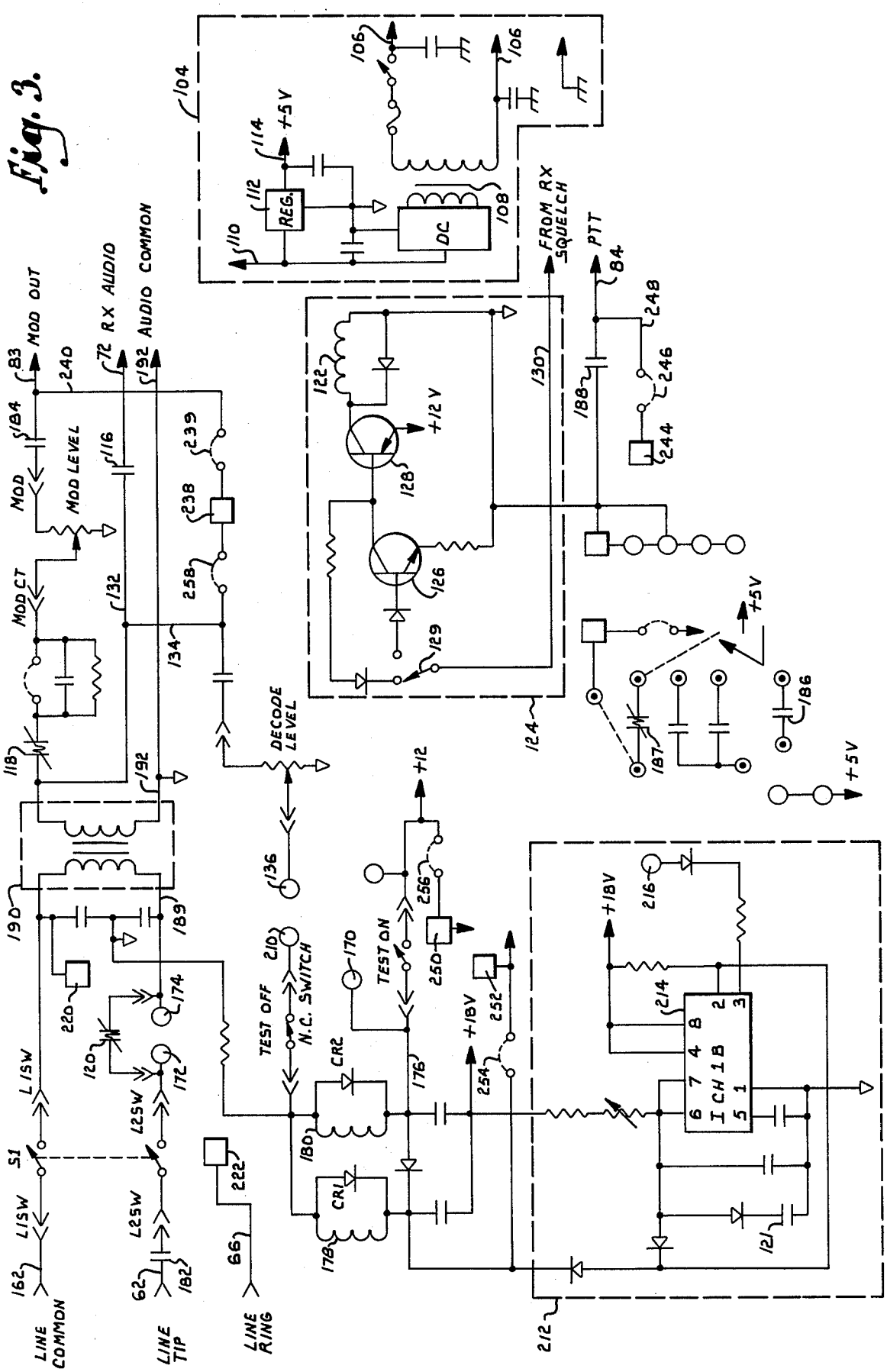
Figure 5:
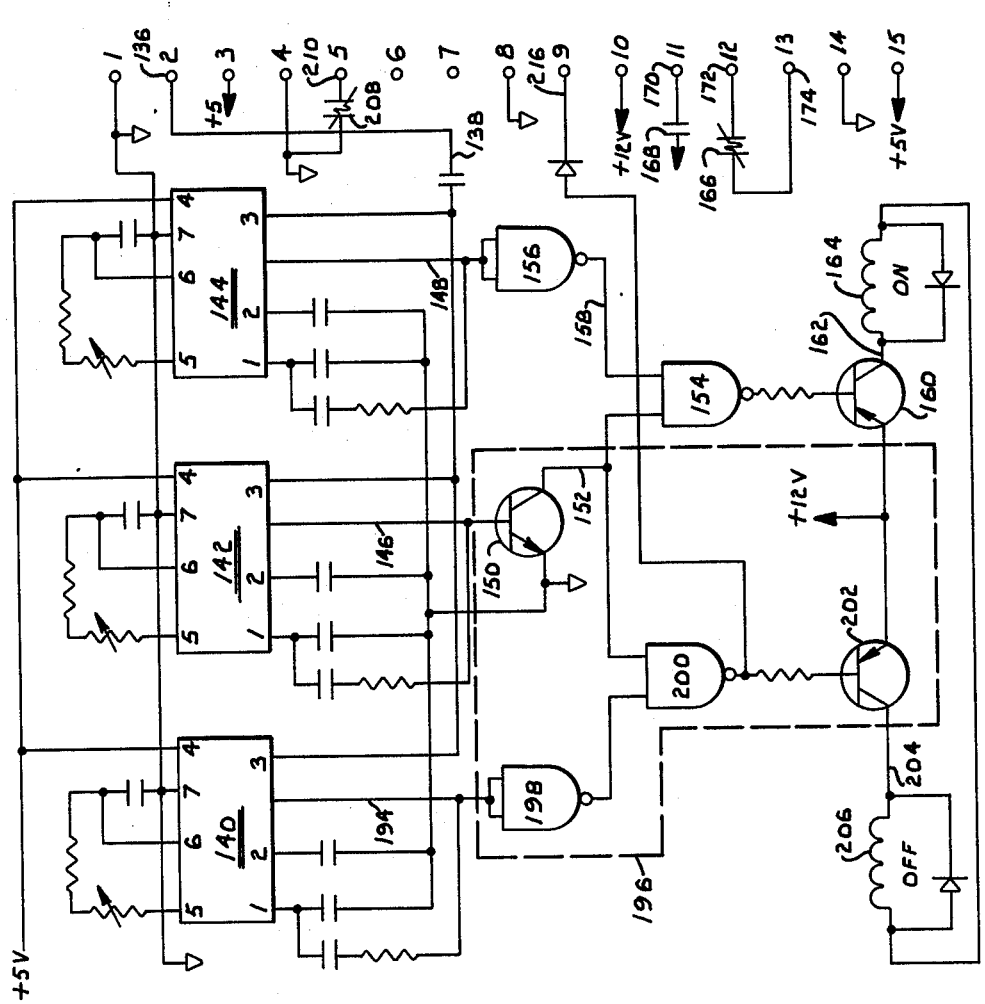
Figure 4:
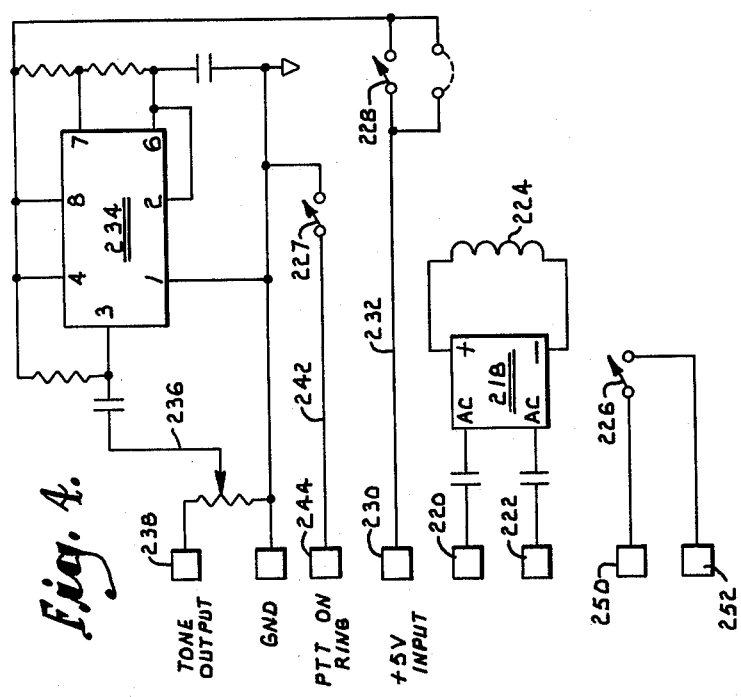

FIGS. 3, 4, and 5 are portions of the detailed schematic diagram of the circuit to electronically interface said base station radio and said telephone terminal.

Figure 1:
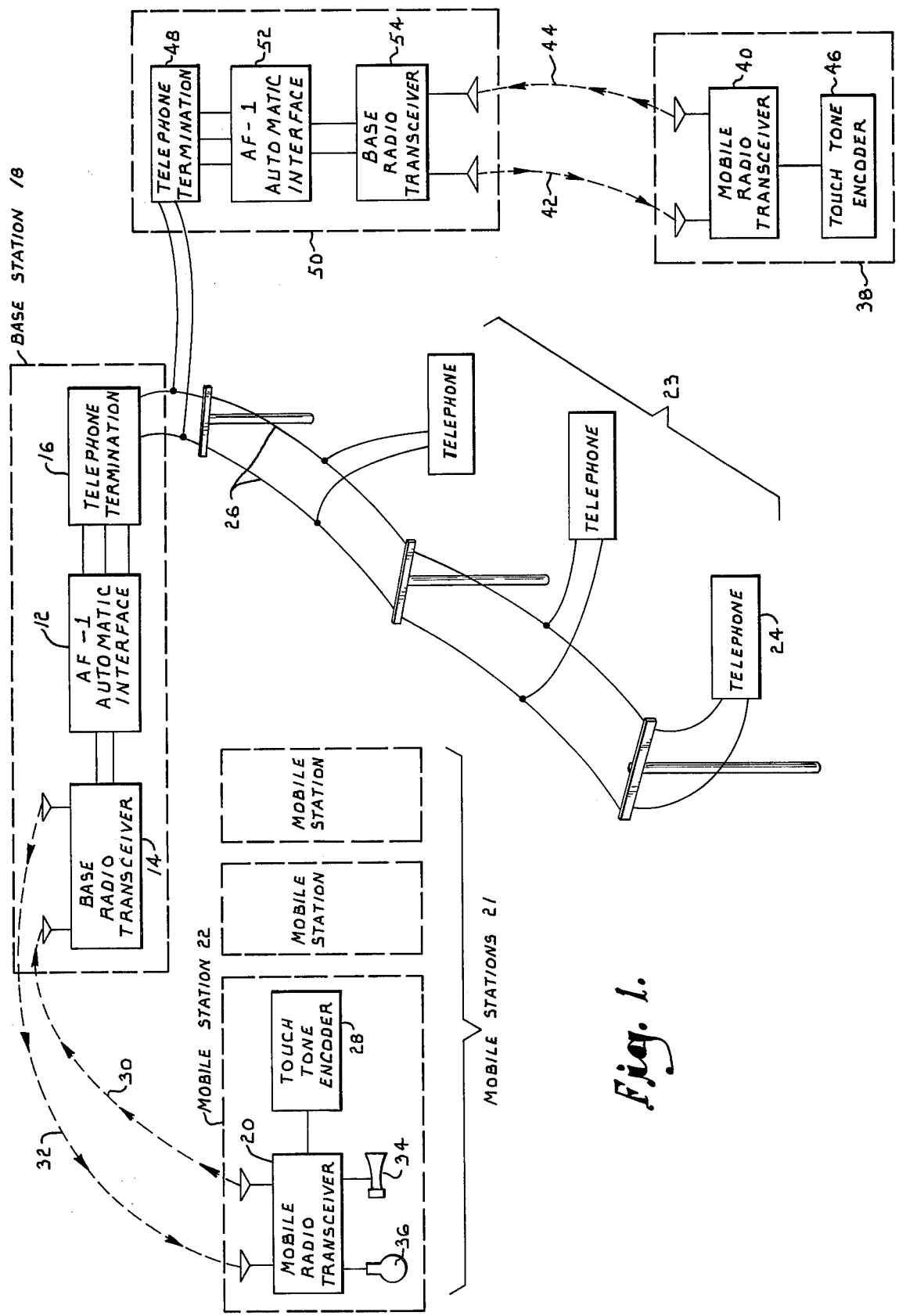
FIG. 1 is a partial block diagram of a radio telephone communications system including circuit means for electronically interfacing half duplexed frequency radio systems with ordinary telephone sets and associated telephone lines and exchange system.

The basic operating principles and features of the invention may best be understood by way of a description with reference to FIG. 1. The subject invention comprises an automatic electrical interface 12 (hereinafter referred to as an AF-1) to communicatively connect a dual (duplexed) frequency base station radio transceiver 14 with an ordinary telephone set 16 located at a base station 18. The AF-1 thereby provides the necessary data link to allow communication via telephone calls between one or more of a plurality of mobile radio stations 21 and any telephone set 23 served by the world wide telephone exchange system 26, including local calls, direct dialed long distance calls, credit card calls, WATS line calls, and Federal Telephone Systems calls, etc.

The AF-1 interface is not intended to comprise a mobile telephone as such but rather is merely intended as an accessory to existing two-way radio systems whereby a caller at a mobile radio station, such as station 22 may dial and place a common telephone call via the base station 18, through the various telephone exchanges 26 to a particular land-line telephone such as telephone set 24. Conversely, any land-line telephone throughout the world may dial a call to the base station 18 which is then routed to the called party or parties at the mobile stations 21.

One unique feature of the AF-1 interface resides in its ability to allow the licensee of the two-way radio base station to maintain control of the radio station's response to calls so placed through the telephone exchanges. Prior art systems are not restrictive in their response to incoming land-line calls, in that any land-line party knowing the telephone number of the telephone associated with the base station radio may intentionally, or unintentionally, dial that number, and thereby gain direct access control of the base station radio transmitter. This lack of control at the base station is not particularly relevant in many applications but does become important with regard to the use of two-way radios in connection with industrial, business and public safety. Certain provisions of the Federal Communications Commission Rules and Regulations (see Parts 89, 91 and 93 for example) specifically state that the licensee must maintain complete control of the base station radio when the radio communications are related to industry, business or public safety. Thus, the prior art mobile telephones cannot be used for industrial business or public safety purposes, whereas the subject invention provides a unique means of allowing the licensee to maintain needed control of the base radio station so as to "legalize" the use of two way radio systems to effect telephone calls relating to the heretofore prohibited areas of communication.

Several modes of operation are made possible by the use of the AF-1 interface, one of which related to placing or originating of a telephone call from a mobile two-way radio station 22. Mobile station 22 comprises a two-way radio (transceiver) 20 connected to an ordinary Touch Tone ® type encoder 28, said mobile station being vehicle installed or of the portable hand held type. The caller at the mobile station 22 depresses the asterisk (*) key of the Touch Tone ® device 28 which produces a "turn-on" enabling signal that is transmitted via a first operating frequency 30 of the mobile radio 20 to the base station 18 where it is received by base station radio 14 and is relayed to the AF-1 interface 12. Upon receipt of the enabling signal, the AF-1, using a later discussed audio coupling device, "patches-through" or connects the base station telephone termination 16 to the base radio 14 thereby establishing an on-line communication link between the telephone exchanges 26 and the mobile station 22. When the base station telephone 16 is patched-through, the common telephone exchange "dial-tone" is delivered via the AF-1 interface 12 to the base station 14 which transmits the same to the mobile station 22 on a second operating frequency 32. Upon hearing the dial tone, the mobile station caller may then proceed to dial the desired telephone number by depressing the appropriate digit buttons on the Touch Tone ® encoder 28. The tones thusly encoded are serially transmitted by the mobile radio 20 on the first operating frequency 30 and are received at the base station 18 by the base station radio 14, said encoded tones then being relayed via the AF-1 interface 12 to the telephone set 16 which, in combination with the telephone exchange, functions to dial the selected telephone number and thereby place the call to a particular land-line telephone 24. The call having been placed, the mobile caller then hears the ringing tone at the called telephone 24 and if the call is answered, the mobile caller may then carry on an ordinary telephone conversation with the called party.

In all modes of operation the operator of mobile radio transceiver 20 maintains complete control of the base station 14's transmitted audio, i.e. when the mobile transmitter is energized the base station 14's transmitted audio is muted. NOTE: the base radio transceiver 14's licensee or his representative is the operator of mobile transceiver 20.

When the above call is completed or at any time the mobile caller wishes to terminate the call, he may do so by depressing the octopher button (# sign) on his Touch Tone ® encoder 28 which results in the transmission (as described above) of a disabling signal from the mobile station 22 to the base station 18. The disabling signal is eventually received by the AF-1 interface 12 and is decoded therein and interpreted as a directive to terminate the call whereupon the AF-1 interface disconnects the telephone set 16 and terminates the call. Further, the AF-1 is similarly responsive to this disabling signal when the same is initiated by the octopher key having been depressed at telephone 24 by the called party. Also, as a further means of maintaining control of the base station by the licensee, the AF-1 interface includes appropriate resettable timing circuitry to automatically terminate a call after a preselected time (typically 1½ minutes) following the last communication transmission from mobile radio transceivers 21. This timing feature overrides the previously described manual means of terminating a call (using the octopher key) and functions to sever the radio-telephone link, thereby transforming the same into an ordinary two-way radio system. This automatic disconnect feature, of course, guards against either party inadvertently failing to terminate the call, which would otherwise "tie-up" the radio and telephone line at the base station.

In another mode of operation, the subject invention allows a land based party to place a call, using a Touch Tone ® telephone 24 to a mobile station 22 having a two-way radio 20. To place a call to a mobile station the calling party at telephone 24 dials the three digit area code and the seven digit telephone number of the telephone termination 16 at the base station 18. The normal connections are then made by the telephone system exchange and a ring is received at the base station telephone termination 16. This incoming call is automatically answered by the AF-1 interface which then responds by returning a second audio dial tone, or "annunciator signal", to telephone 24, said annunciator signal functioning as an acknowledgement to the caller that the call has been answered. The AF-1 interface 12 maintains a continuous operative connection to the base station radio, such that upon answering an incoming telephone call, a partial connection is made between the base station radio 14 and the calling party via the base station telephone termination 16. Thus, the calling party at telephone 24 hears both the above mentioned annunciator signal as well as transmissions and receptions on the base station radio 14 as soon as the incoming call is answered by the AF-1 interface. However at this point, the base station radio 14 is not responsive to a caller's attempt to transmit to the mobile unit 22.

To prevent unauthorized or accidental use of the system, the calling party at telephone 24, after hearing the annunciator signal and noting the absence of communications "traffic", must then respond by supplying the enabling signal to the AF-1 interface 12 in order to enable communication with the called party at mobile station 22. The calling party supplies this enabling signal by depressing the asterisk (*) button on the Touch Tone ® board of his telephone, or alternatively for security purposes, the necessary signal can comprise a coded combination of up to ten digits selected from a Touch Tone ® keyboard. By using a coded enabling signal the base radio licensee may selectively disseminate the code to persons authorized to use the base radio and thereby maintain the necessary control of the base radio, as required by the FCC.

Upon receipt of the necessary enabling signal, the AF-1 interface 12 completes the interconnection of the base station telephone 16 and radio 14 and further functions to mute the annunciator signal. This ending of the annunciator signal is particularly important since, conforming to present rules of the FCC, this signal change acts as an audible carrier indicator that the base station radio 14 is operative to transmit and receive communications via the connected telephone lines. The necessary communication link between the calling party at telephone 24 and the base station radio 14 having been made, the calling party may then orally page the called party over the base station radio via the base station transmission frequency 32. The called party at mobile station 22, upon hearing the page from the caller at telephone 24 on frequency 32 may then answer the same by voice transmission on frequency 30. Finally, as was previously dis-cussed, at the end of the communications either party may terminate the radio-telephone data link by depressing his octopher key, and in any event, the timing circuitry in the AF-1 interface will disconnect the data link after a prescribed time interval following the last communication between the parties.

An important and particularly flexible feature of the subject invention provides for notifying a mobile station party that an incoming telephone call has been placed to the base station. Integral circuitry of the AF-1 interface which we call an "answer-up" feature, essentially receives the incoming ringing signal at the base station and causes the same to be relayed to the mobile station where the said relayed signal is used to operate a visible or audible alerting means to notify the called party that a call is pending at the base station. With reference to the previous discussion of a call placed from a land-line telephone to a mobile station it may be remembered that the incoming call was automatically answered by the AF-1 interface at the base station and that the calling party then notified the mobile party by vocally paging him via transmission from the base station radio.

The answer-up feature contemplates a somewhat different mode of operation however, which can be described as follows. The ringing signal received at the base station 18 (denoting an incoming call from telephone 24) is detected by the AF-1 interface 12 which responds thereto by delivering the priorly discussed annunciator signal to the base station radio 14 thereby activating the transmitter of same. The base station radio then transmits an intermittent alerting signal (in step with the received ring signal) on operating frequency 32 to the mobile station 22 where said signal is received by the mobile station radio 20 and may be audibly detected on the radio speaker or may instead be used to activate the vehicle's horn 34 or a light means 36 to signal the mobile party of the incoming call. Since the base station transmitter is directly enabled by the received ringing signals from the telephone lines, the duration of the above mentioned transmissions from the base station 18 to the mobile station is the same as the duration of the received ringing signals. In other words, the telephone ringing signal is simply relayed to the mobile station.

It can be observed from the foregoing, that incoming calls to the base station produce only an intermittent operation of the base station transmitter for the limited purpose of signaling or alerting the called party. Upon being alerted of an incoming call by the transmitted signaling, the mobile station party may receive the call by depressing the asterisk (*) key of his Touch Tone ® keyboard 28 which causes the enabling signal to be returned via the mobile station radio 20 on operating frequency 30 to the base station 18 where it is received by the base station radio 14 and then relayed to the AF-1 interface 12 which responds thereto by patching-through the pending telephone call. The normal two-way telephone type conversations may then take place, and the eventual termination of the call is as previously described.

The above described answer-up feature is especially useful in fire, police and security applications. For example, in a shopping center setting, a store owner in distress having a telephone 24 may notify and summon mobile radio equipped security guards 21 in the vicinity of the shopping center by simply dialing the telephone number of the telephone 16 at base station 18. The resulting ringing signal is then relayed by the AF-1 interface 12 and base station radio 14 to each of the security guards 21 and any single guard may then answer the call by depressing the asterisk key on his encoder. When such a call is answered, the store owner can engage in two-way communication, simultaneously with all mobile stations 21, thereby directing and instructing the guards respecting the security emergency. Thereafter, any operator may terminate the call by pressing his octopher key, thereby clearing the communication system for subsequent incoming security calls to the base station.

In a similar operational mode, the answer-up feature allows a mobile station party 22 such as a policeman in a twoway radio equipped vehicle to answer incoming calls to an unattended base station 18 such as the police station or city hall in a small town where it is impractical to staff such a station during the evening hours.

The use of multiple AF-1 interface devices at various geographic locations, functioning in combination with ordinary telephone lines interconnecting the associated base station radios, offers a further method of operation, which makes possible two-way communication between two mobile station radios operating on different frequencies. In illustration of this application, assume first that a police officer of City X, having a mobile radio 22 which operates on frequencies 30 and 32 wishes to immediately converse with a patrolling police officer of City Y located at mobile station 38 equipped with both a mobile transceiver 40 operating on frequencies 42 and 44, as well as a Touch Tone ® encoder 46. Under these circumstances, the officer at mobile station 22 depresses his asterisk (*) key thereby obtaining access to a telephone line 26 outgoing from base station 18. The calling officer then dials the telephone number 46 of telephone 48 at base station 50 located in City Y. The call is placed over the telephone lines 26 and the officer at City Y is signalled. The City Y officer may then elect to answer the call by depressing his asterisk (*) key. Upon receiving the asterisk tone from an officer in a City Y's mobile unit, the AF-1 terminates (puts load on line), the ringing thereby permitting the call to come through. The call thusly received and answered, the two policemen in different cities may then communicate over their mobile radios which operate on different frequencies, with the AF-1 interfaces and existing telephone lines supplying the necessary interconnecting communications link.

Figure 2:
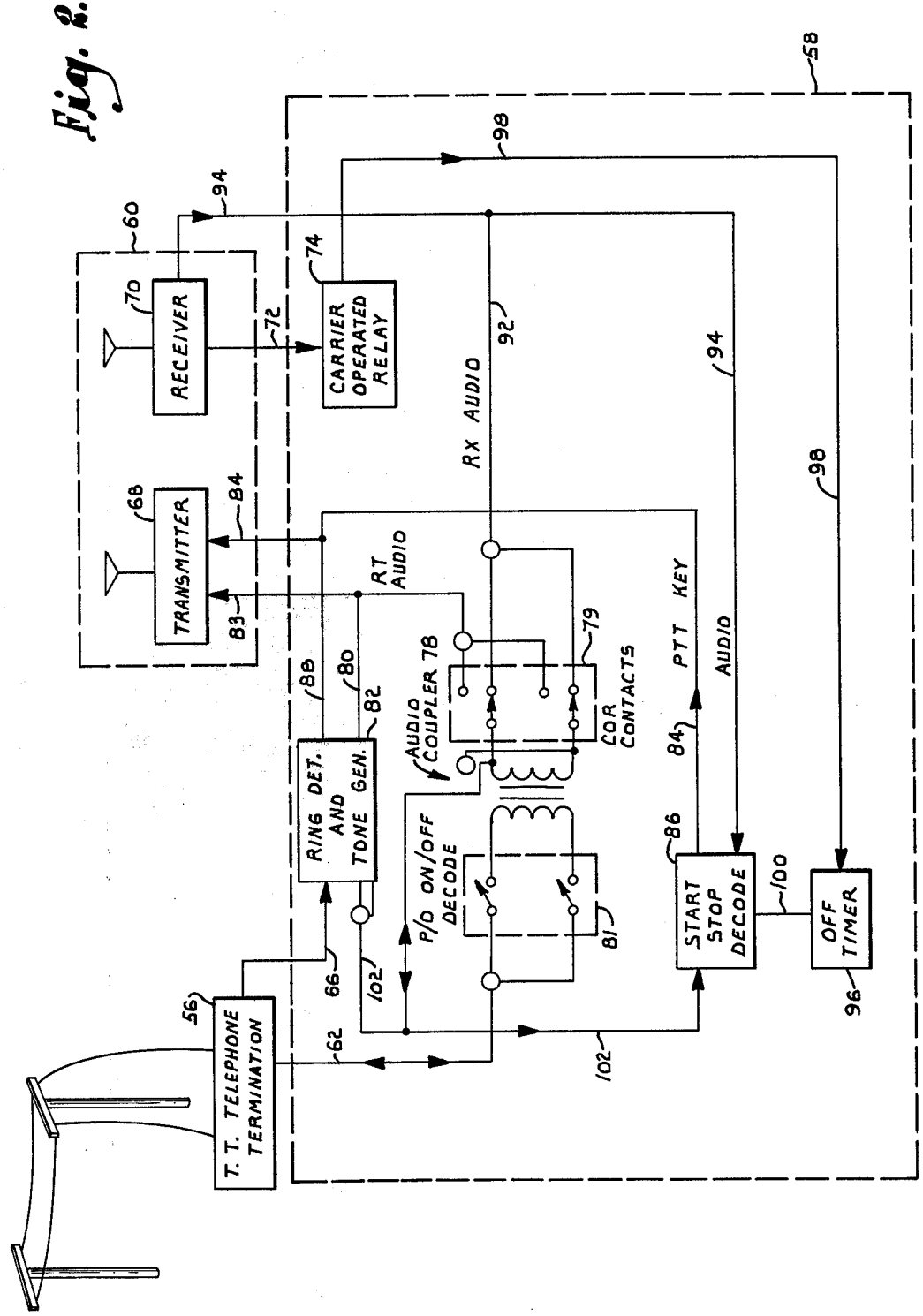
FIG. 2 is a partial block diagram for electronically interfacing a half duplexed frequency base station radio transceiver with an ordinary telephone set.

Reference is now made to FIG. 2 wherein the component devices of a base station are depicted, including at telephone termination 56, an AF-1 automatic interface generally shown within the broken line 58, and a dual frequency radio transceiver shown within the broken line 60. The ordinary Touch Tone ® telephone termination 56 has its incoming lines 62 and 66 connected to the AF-1 interface 58. A common radio transceiver 60 having two independent radio frequency channels 68 and 70 for half duplexed radio communication, has its receiver channel 70 connected via line 72 to a carrier frequency operated relay 74 contained within the AF-1 interface 58, while the two necessary inputs to the transmitter channel portion 68 of said radio transceiver comprise either a modulated audio signal on line 83 derived within the AF-1 interface 58 from the audio coupler 78 or an audio tone on line 80 delivered by the ring detection and tone generation circuitry 82, the second needed input to said transmitter in turn comprising either a PTT key signal on line 84 as derived from the decoding circuitry 86 or alternatively, a ring detection signal on line 88 which is produced in the ring detection and tone generation circuitry 82.

Assuming a mobile unit operator wishes to obtain an outgoing telephone line in order to place a call, the operator first depresses the asterisk (*) key on his Touch Tone ® keyboard which then produces an enabling 941/1209 Hz audio "turn on" signal that is transmitted via the mobile unit radio transmitter and is received on the receiver channel 70 of the base station radio. This received turn-on signal is then delivered via line 94 to the AF-1 interface 58 and more particularly to the start-stop decode 86. The received turn-on signal is decoded and validated by the decoder circuitry 86 which then functions to cause the on-off relay 81 to be switched and thereby connect the one side of the audio coupler 78 with the telephone line 62. The carrier operated relay 74 detects the absence of carrier (due to mobile in listen mode). Upon delivery of the above mentioned turn-on signal via line 72 the contacts of COR 79 are switched such that the transmitting audio line 83 is series connected through the audio coupler 78 to the outgoing telephone line 62. Thus, in accordance with the foregoing description, the telephone station 56 is "patched through" to the base station radio 60 such that the audio signals received from a distant telephone are delivered to the AF-1 interface 58 on line 62 and then pass through the audio coupler 78, finally being received via line 83 by the base station transmitting channel 68 which then transmits the same to the mobile station's receiver. The mobile unit operator's audio is received by the base station receiver channel 70 and is then directly routed via line 94 to the AF-1 interface 58, thence through the closed contacts (due to the mobile in transmit mode) of carrier operated relay 79 and finally to the telephone line 62.

The mobile unit operator may cause the telephone lines to be disconnected and thereby terminate the call by depressing the octopher (#) key on his Touch Tone ® encoder which produces a disabling 1477/941 Hz "turn-off" signal. This "turn-off" signal is received by the receiver portion 70 of the base station radio 60 and follows a circuit path similar to the priorly mentioned turn-on signal, being received by the decoder circuitry 86 which responds to said signal by switching the on-off relay thereby disconnecting telephone line 62 from the audio coupler 78. Likewise, this same 1477/941 Hz "turn-off" signal may be produced by the distant telephone set, as discussed previously, and the resulting signal is received by the decoder circuitry 86 on telephone line 102 with the resulting termination of the call occurring as previously described.

As mentioned previously, a telephone call may also be terminated after a preselected time period following the last transmission from the mobile station operation. This is accomplished through the use of a timing circuit 96 which monitors via line 98 the presence of received carrier from the mobile radio station, as detected by the carrier operated relay 74. If the appropriate signal is not received on line 98 by the timing circuitry 96 within a prescribed time, said timing circuitry then delivers an "off signal" on line 100 to the decoder circuitry 86 which then functions to terminate the call as described above.

In the "answer-up" mode of operation, the ringing signal at telephone termination 56 produced by an incoming call, is transmitted via line 66 to the ring detector and tone generating circuitry 82 wherein an audio annunciator tone is generated for the duration of each detected ring. The generated annunciator tone is then delivered on line 80 and branch line 83 to the transmitter channel 68 of base station radio 60 which then transmits the same upon receipt of an enabling signal also received from the circuitry 82 via lines 88 and 84. The ringing signal having been transformed to an annunciator tone and delivered to the mobile units, the mobile unit operator, alerted by the received annunciator tone may then depress his asterisk key causing the AF-1 interface 58 to patchthrough the telephone line (as previously described) and thereby answer the incoming call.

If, however, the answer-up mode is not utilized, the response of the AF-1 inerface to an incoming call is somewhat different. The ring produced by an incoming call is received on line 66 and causes an annunciator tone to be generated, as discussed above, in the circuitry 82, also relay 81 is operated. This annunciator is then delivered via line 102 to the audio coupler 79 and is then returned to the calling party on telephone line 62. Upon hearing the annunciator tone, the calling party may then depress his asterisk (*) key or other key combinations, the resulting received tones effecting the patching-through of the telephone line to the base station radio, as previously described.

Turning now to a detailed description of the AF-1 interface circuitry, the power supply to the same is shown in FIG. 3 and is generally indicated within the broken-line 104. 110 volt, 60 Hz power is received on leads 106 from a wall plug (not shown) and is converted to a lower voltage DC by transformer and rectifier combination 108. A portion of the resulting direct current output is then used to supply, via line 110, various circuitry requiring an 18 volt source while the DC output of said transformer-rectifier is also delivered to regulator 112 which in turn yields a 5 volt signal on its output line 114 to drive the electronic devices at various points throughout the circuitry.

The incoming telephone lines previously identified as lines 62 and 66 in FIG. 2 are shown by the like numerals in the upper left portion of FIG. 3 while lines interconnecting the base station transceiver with the AF-1 interface, viz. modulator output 83, prepared to transmit (PTT) 84, and receiver audio 72, likewise bear the same numerals in both FIGS. 2 and 3.

The carrier operated relay 74 previously mentioned with reference to FIG. 2 comprises several relay contact pairs which are individually depicted in FIG. 3 by the numerals 116, 118, 120 and 121, the coil for the same being designated by the numeral 122. A received carrier signal, activates the carrier operated relay by means of the energizing circuit generally indicated within the broken line 124 which comprises transistor 126, transistor 128, switch 129, and relay coil 122. The control input to the energizing circuit is received on line 130 from the receiver squelch circuit of the base station radio (not shown). Upon the receipt of a transmission from a mobile radio, the squelch line 130 supplies a negative going signal to the base of transistor 128, thereby turning on said transistor, the 12 volts supplied to the emitter of same is connected through to its collector, thereby energizing and switching the contacts of the series connected relay coil 122. Relay coil 122 remains energized for the duration of the received audio signal. It should be noted that during the time no carrier is detected by the receiver squelch circuit the COR is deenergized and audio is delivered on line 83 to the base station transmitter. When the utilized base station receiver supplies a positive going squelch signal, switch 129 connects said signal to the base of transistor 126, which is essentially an inverter thereby providing a negative going signal for the base of transistor 128. It should be noted here that several solid state devices could likewise perform the switching function provided by the above mentioned carrier operated relay.

The carrier operated relay having been energized, the received audio on line 72 passes through the closed contacts 116 (normally open) and is delivered on line 132 and branch line 134 to the interconnect pin 136. The interconnect pin 136 comprises one of the several inputs to the decoding circuitry (previously generally referred to by the numeral 86 in FIG. 2) as seen in FIG. 5. The received audio signal, such as the previously discussed 941/1209 Hz turn-on signal, is then simultaneously delivered via line 138, to each of the inputs of the linear integrated circuits 140, 142 and 144, such as those manufactured by the Signetics Corporation and identified by their number 567. These integrated circuits each comprise phase-locked loops which function to drive connected loads whenever a sustained frequency within their respective detection bands is present at their inputs. As in the present application, these integrated $d$ circuits are often used to decode Touch Tone ® encoded signals. The detection bands for these integrated circuits are adjustable and in the present case, chip 140 is tuned to respond to a 1477 Hz input, while chips 142 and 144 respond to 941 and 1209 Hz input signals, respectively.

Assuming now that the 941/1209 Hz signal is received at the inputs of each of the aforementioned integrated circuit chips, chip 142 will respond to the 941 Hz signal while chip 144 responds to the 1209 Hz signal, said responses being delivered as low signals on output lines 146 and 148, respectively. The low output of chip 142 turns off transistor 150 whose base is connected thereto, thereby switching the collector of same from the grounded emitter, with the resulting high emitter line 152 comprising one input to NAND gate 154. A second high input to NAND gate 154 is derived from the output of NAND gate 156 via line 158, which goes high when the dual connected inputs to same receive the low output signal on line 148 from chip 144. Both inputs to the NAND gate 154 having gone high, the low output of same is delivered to the base of transistor 160 thereby switching 12 volts from the emitter through to the collector of same, this 12 volt signal then being delivered on line 162 to the coil 164 of the associated "on" relay contacts pairs 166 and 168. Upon energization of the "on" relay, a 12 volt source is series connected across the closed contacts (normally open) 168 to interconnection pin 170, while the normally closed contacts 166 are switched open thereby open circuiting the circuit connected across interconnection pins 172 and 174, which can be seen in the upper left portion of FIG. 3 to be the incoming telephone line 66. The switching thusly performed by the relay contacts 166 functions to prevent the received audio "on-signal" from being delivered to the telephone lines and causing a digit to be dialed. However, upon termination of the "on-signal", coil 164 is de-energized and contacts 166 resume the normally closed state.

Returning now to FIG. 3, the above discussed "on-relay" having been energized for the duration of the "on-signal", the 12 volt signal present at pin 170 is delivered on line 176 to relay coils 178 and 180, coil 178 switching closed the normally open contact pairs 187 and 188. The relays associated with coils 178 and 180 are "latched-in" and are unresponsive to a later deenergization of the "on-relay" coil 164. The closing of contact pair 182 effects the series connection of the incoming telephone line 64 with one input line 189 to one side of an audio coupling transformer designated within the broken line 190, a second input line to the other side of said transformer being the telephone line 162. Similarly, with respect to the other side of the audio coupling transformer 190, the closing of contact pairs 184 results in the series connection of modulator output line 83, through the normally closed relay contacts 118 to the transformer, a second input to the same side of said transformer being the grounded audio common line 192.

According to the above description then, the incoming telephone lines 62 and 64 are connected or "patched-through" via the audio coupling transformer 190 to the modulator output line 83 during no received signal condition and receiver audio line 72 during a received signal condition with the above mentioned interconnecting relays being latchedin, to enable the communications link between the telephone lines and the base station radio, for the duration of the call. This communications link is terminated by unlatching the various aforementioned relays as will be discussed presently.

Following a circuit path similar to that of the received "turn-on" signal, the 1477/941 Hz "turn-off" signal is received by the decoding circuitry on pin 136 (as shown in FIG. 5) and is then delivered via line 139 to the inputs of chips 140, 142, and 144. In accordance with the previously discussed tuning of each chip, the 1477/941 Hz combination signal prompts an output response from chips 140 and 142 on lines 194 and 146. These outputs are then delivered to the logic and transistor combination 196 comprising NAND gate 198, transistor 150, NAND gate 200, and transistor 202, the output of said combination on line 204 being used to energize the "off" relay 206, thereby switching open the normally closed contact pair 208. The open circuiting of contacts 208 consequently breaks the grounding of interconnect pin 210 which in turn breaks the grounding (as seen in FIG. 3) of relay coils 178 and 180, one side of each said coils being connected in parallel with pin 210. As the grounding is interrupted, both coils 178 and 180 are de-energized and their associated contact pairs (previously discussed) are switched, or "unlatched", thereby breaking the interconnected telephone line-base radio communication link.

Alternatively, coils 178 and 180 may be automatically de-energized after a preselected time period following the last switching of the carrier operated relay, by means of the protection circuit designated by the broken line 212. The protection circuit comprises relay contacts 121 and a programmable timing integrated circuit which is used in a monostable mode of operation in the present application. After the carrier operated relay is activated and the telephone line is linked up to the base station radio, the chip 214 begins a timing cycle using capacitor charging means. The timing capacitors are discharged each time the carrier operated relay contacts 121 are closed in response to a communication through the AF-1 interface. However, if at the end of any 45 second time period, a communication has not taken place, then the chip 214 triggers and discharges on line 216, which results in the energization of relay coil 206 (FIG. 5) thus terminating the communication link.

Attention is now directed to FIG. 4 which depicts circuitry related in part to the "answer-up" feature of the invention, previously referred to in part as the ring detection and tone generation circuitry shown by the numeral 82 in FIG. 2. The incoming telephone common line 62 and ring line 66 (FIG. 3) are delivered to the rectifying bridge 218 via interconnection pins 220 and 222, respectively. The common ringing signal denoting an incoming call is rectified from AC to DC by the bridge 218 and is then applied to the relay coil 224, thereby temporarily energizing the same for the duration of the incoming ringing signal. Relay coil 224 operates on the normally open contact pairs 226, 227 and 228, switching them closed upon receipt of each rectified ringing signal. Each time contact pair 228 is closed the 5 volt supply at pin 230 is delivered via line 232 to the input of integrated circuit chip 234. Chip 234 is a programmable timing device which is used in an astable mode as a multivibrator in the present case. Chip 234 produces an audible tone on its output line 236 each time it is triggered on its input as a result of the switching of contacts 228.

With respect to the previously discussed answer-up mode of operation wherein the mobile units are alerted to an incoming telephone call, the output tone on line 236 is delivered to interconnect pin 238. As seen in FIG. 3, a jumper line 239 is required to connect the pin 238 with line 240 which conveys the audio tone present at pin 238 to the modulator line 83 which in turn delivers said tone to the base station transmitter. Returning momentarily to FIG. 4, as the relay contacts 227 are opened and closed in step with the ringing signal, the series connected line 242 is intermittently grounded and the resulting signals produced thereby are delivered to interconnection pin 244 and comprise the PTT enabling signals. These enabling signals are then delivered via pin 244 in FIG. 3 through the necessary jumper line 246 and line 248 to the PTT line 84, and are finally received at the base station transmitter thereby activating the transmission of the audible tones to the mobile radio unit. Upon hearing these tones, the mobile unit operator may effect the communications link-up by activation of his asterisk key and the call is patched-through with the various circuitry functioning as previously described.

As an alternative to the answer-up mode, the user of the subject invention may opt for the earlier discussed automatic answering mode, by field alteration of the placement of several jumper lines. In this alternate operational mode, the switching of contacts 226 (FIG. 4) shorts the pair of interconnecting pins designated by the like numerals 250 and 252 in both FIGS. 3 and 4. As seen in FIG. 3, the shorting of pins 250 and 252 completes a circuit across jumper lines 254 and 256 thereby energizing and latching in the relay coil 178 which in turn connects the incoming telephone line to the audio coupler 190 thereby allowing the land-line caller to hear the audio received by the base station radio receiver. Relay 180 has not been energized at this time and no PTT signal is applied to line 89. The annunciator tone output from chip 234 is delivered via pin 238 across the jumper line 258 and line 134 through the audio coupler 190 to the land-line party. Further, the relay coil 122 contact pair 120 also effects the interconnection of the telephone line audio into the decoding circuitry such that the land-line caller may initiate the 941/1209 Hz "on-signal" to complete the communications link, by energizing relay 180, the specific functioning of the circuitry being similar to that discussed earlier. In the event that the mobile unit does not answer the oral page within approximately 30 to 90 seconds, ship 214 functions to terminate the communications link by energizing the "off" relay coil 206. The caller may de-energize the circuit by pressing the octopher button.

From the foregoing it will be seen that this invention is one well adapted to attain all of the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus for communication between a half duplexed frequency radio system, and a plurality of telephone subscriber subsets operable to generate a plurality of tone signals for calling other subsets and for providing coded enabling and disabling signals, each said telephone subscriber subset having an individual dial number and being interconnected with a telephone dial network, one of said subsets being connected to and having a dial number associated with said radio system, said apparatus comprising:

a plurality of mobile ratio units each equipped with a receiver having an operating frequency channel $f_1$, a transmitter having an operating frequency channel $f_2$, and pushbutton operated tone generating means connected to said mobile unit transmitter, said mobile unit transmitter operative in response to manual operation of said tone generating means to transmit tone signals;

a base station radio having the combination of a radio transmitter having said operating frequency channel $f_1$, and a radio receiver having said operating frequency channel $f_2$; and interface means for interconnecting said base station transmitter and said base station receiver with said telephone dial network, said interface means being operable to couple a calling telephone subset with the base station radio receiver in response to ring pulse signals from said calling subset and further operable to couple said calling subset with the base station radio transmitter in response to a properly coded enabling tone signal from said calling subset.

2. The combination as in claim 1 wherein said base station radio receiver is normally operable in response to receipt of voice signals from one of said mobile units to operate said base station radio transmitter to transmit said received voice signals to other ones of said mobile units and wherein said interface means includes means operated in response to receipt by said base station receiver of a disabling tone signal transmitted by one of said mobile units to effect the disconnection of said calling telephone subset from said base station radio.

3. The combination as in claim 1, wherein said interface means includes means operated in response to receipt of a properly coded disabling tone signal from said calling telephone subscriber subsets to effect the disconnection of said calling telephone subset from said base station radio.

4. The combination as in claim 1 wherein said interface means includes circuitry means for automatically disconnecting said calling subset from said base station radio after a prescribed period of time following the last communication transmission through said interface means.

5. The combination as in claim 1 wherein said interface means includes means in response to said received ring pulse signal to complete a first circuit path from said calling subset through said interface means to said base station receiver, said interface means further operated in response to enabling tone signals from said calling subset to complete a second circuit path from said calling subset through said interface means to said base station transmitter.

6. The combination as in claim 5 wherein said interface means includes means effecting the delivery of an annunciator tone to said calling subset upon completion of said first circuit path.

7. The combination as in claim 6 including interface means having further means to mute said annunciator tone upon completion of said second circuit path.

8. The combination as in claim 1 wherein said interface means includes a means for matching the impedance of said telephone dial network with the impedance of said base station radio, means for receiving ring pulse signals from said calling subset, said ring receiving means operative in response to receipt of said ring pulse signals to complete circuit connections between said calling subset and said impedance matching means, and further operative to complete circuit connections between said impedance matching means and said base station receiver, means for generating an annunciator tone, said tone generating means operative in response to activation by said ring reception means to deliver said annunciator tone to said calling subset, and means for decoding communication signals, said decoding means being activated by said ring reception means and operative to decode said enabling tone signals received from said calling subset, said decoding means further operative to complete circuit connections between said calling subset and said impedance matching means and between said impedance matching means and said base station transmitter.

9. The combination as in claim 8 wherein said impedance matching means includes a circuit means for inductively coupling said telephone dial network with said base station radio.

10. The combination as in claim 8 wherein said ring pulse signal reception means includes a means for rectifying said ring pulse signals from said telephone dial network, and means for switching electrical contacts, said switching means being connected to said rectifying means, and operative in response to a rectified ring pulse signal received from said rectifying means to complete circuit connections between said tone generating means and said calling subset, and further operative to complete said circuit connections between said calling subset and said impedance matching means and between said impedance matching means and said base station receiver.

11. The combination as in claim 8 wherein said decoding means includes a plurality of detection circuit means, each of said detection circuit means being operative to detect a certain one of a plurality of modulated signals received from said calling subset, each said detection circuit means being further operative to deliver an output signal upon detection of said certain ones of modulated signals, and means for switching electrical contacts, said switching means being connected to said detection circuit means, and operable in response to said detection circuit means output signals to complete said circuit connections between said calling subset and said impedance matching means, and between said impedance matching means and said base station transmitter.

12. The combination as in claim 1, wherein said interface means includes means for closing a circuit path from said calling telephone subset through said interface means to said base station transmitter for a time duration corresponding to the time duration of one of said ring pulse signals received from said calling subset, said interface means being further operative to activate said base station transmitter for a time duration corresponding to the time duration of said closure of said circuit path.

13. The combination as in claim 12 wherein said interface means includes circuit means to generate an annunciator tone for a time period corresponding to the time duration of one of said ring pulse signals, said interface means being operative to deliver said annunciator tone through said closed circuit path to said base station transmitter, said interface means being further operative to activate said base station transmitter to transmit said received annunciator tone to said mobile radio units.

14. The combination as in claim 13 wherein said interface means includes a means for receiving ring pulse signals from said calling subset, said ring pulse signal reception means operative in response to receipt of said ring pulse signals to complete circuit connections between said dial network and said tone generation means.

15. The combination as in claim 14 wherein said ring pulse signal reception means includes a means for rectifying ring pulse signals received from said telephone dial network, and means for switching electrical contacts, said switching means being operated upon receipt of said rectified ring pulse signals to complete connections between said rectifying means and said tone generating means.

16. The combination as in claim 1 wherein said interface means includes means for disabling said base station radio transmitter during the time period that a mobile unit is transmitting.

17. Apparatus for communication between a half duplexed frequency radio system and a plurality of telephone subscriber subsets, each said telephone subscriber subset having an individual dial number and being interconnected with a telephone dial network, one of said subsets being connected to and having a dial number associated with said radio system, said apparatus comprising:

a plurality of mobile radio units each equipped with a receiver having an operating frequency $f_1$, a transmitter having an operating frequency $f_2$, and pushbutton operated tone generating means connected to said mobile unit transmitter, said mobile unit transmitter operable in response to manual operation of said tone generating means to transmit tone signals;

a base station radio having the combination of a radio transmitter having said operating frequency channel $f_1$, and a radio receiver having said operating frequency channel $f_2$; and interface means for interconnecting said base station transmitter and said base station receiver with said telephone dial network, said interface means including first, second, third, and fourth switching means, said first switching means being operable in response to a first tone signal received by said base station receiver from one of said mobile units to connect said base station receiver to a decoding circuit means, said decoding means operative to receive and detect said first tone signal and responsive to the detection of said first tone signal to operate said second switching means; and second switching means operating to activate said third and fourth switching means; said third switching means operative to complete a circuit path from said telephone dial network through said interface means to said base station transmitter; said fourth switching means connected to said base station transmitter and operative to enable transmission from said transmitter; said interface means operable to deliver a dial tone from said telephone dial network through said completed circuit path to said base station transmitter for transmission to said mobile units; said interface means remaining conditioned to receive a plurality of subsequent tone signals from said base station receiver corresponding to the telephone dial number of a called telephone subscriber subset, and operable to transmit said subsequent tone signals to said telephone dial network.

18. The combination as in claim 17 wherein said base station radio receiver includes means normally operable in response to receipt of voice signals from one of said mobile units to operate said base station radio transmitter for transmission of said received voice signals to other ones of said mobile units.

19. The combination as in claim 18 wherein said interface means includes means operated in response to receipt by said base station receiver of a disabling tone signal transmitted by one of said mobile units to effect the disconnection of said called telephone subset from said base station radio.

20. The combination as in claim 17 including means for operating said interface means in response to receipt of a disabling tone signal from said called telephone subset to effect the disconnection of said called telephone subset from said base station radio.

21. The combination as in claim 17 wherein said interface means includes circuitry means to automatically disconnect said called subset from said base station radio after a prescribed period of time following the last communication transmission through said interface means.

22. The combination as in claim 21 wherein said automatic disconnect circuitry means includes means for interconnecting same to said first switching means, said first switching means operative to reset said automatic disconnect circuitry upon each activation of said first switching means.

23. The combination as in claim 17 wherein said interface means includes an energizing circuit means connected to said first switching means and an output line of said base station receiver, said energizing circuit means operated in accordance with an output signal on said receiver output line to activate said first switching means.

24. The combination as in claim 17 wherein said decoding means includes a plurality of detection circuit means, each said detection circuit means being operable to detect a certain one of a plurality of modulated tone signals received from one of said mobile radios through said base station receiver, and being further operative to deliver an output signal upon detection of said certain ones of modulated tone signals, and logic circuitry means connected to said detection circuit means and said second switching means, said logic circuitry means operable to produce an output response in accordance with a combination of output signals received from said detection circuits, said logic circuit means output response operable to activate said second switching means.

25. The combination as in claim 24 wherein said interface means includes a means for matching the impedance of said telephone dial network with the impedance of said base station radio.

26. The combination as in claim 25 wherein said impedance matching means includes a circuit means for inductively coupling said telephone dial network with said base station radio.

27. The combination as in claim 26 including means for connecting said third switching means between said dial network and said coupling circuit means and between said coupling circuit means and said base station transmitter, said third switch means being operable to complete a closed circuit path from said dial network through said coupling circuit means to said base station transmitter.

28. The combination as in claim 27 including means for effecting the operation of said second switching means in response to said first tone signal to temporarily open circuit a closed circuit path from said dial networkk to said coupling circuit means for a time duration corresponding to the duration of said output response from said logic circuitry.

29. A method for effecting communication between a half duplexed frequency radio system and a plurality of telephone subscriber subsets operable to generate a plurality of tone signals for calling other subsets and for providing coded enabling and disabling signals, each of said telephone subscriber subsets having an individual dial number and being interconnected with a telephone dial network, one of said subsets being connected to and having a dial number associated with said radio system, said method comprising the steps of equipping a plurality of mobile radio units with a receiver having an operating frequency channel $f_1$, and a transmitter having an operating frequency $f_2$ interconnecting with a manually operated tone generating means, said mobile unit transmitter being operative in response to manual operation of said tone generating means to transmit tone signals;

operating a base station radio transmitter at a frequency channel $f_1$ and a base station radio receiver at a frequency $f_2$; and interconnecting said base station transmitter and said base station receiver with said telephone dial network and effecting the interconnection of a calling telephone subset with said base station radio receiver in response to ring pulse signals from said calling subset and the interconnection of said calling subset with said base station radio transmitter in response to a properly coded enabling tone signal from said calling subset.

30. The method as in claim 29 including the step of disabling said base station radio transmitter during the time period that a mobile unit is transmitting.

* * * * *